(No Model.)
F. H. DURELL & W. GOLDIE.
BOOM STICK.
No. 276,789. Patented May 1, 1883.
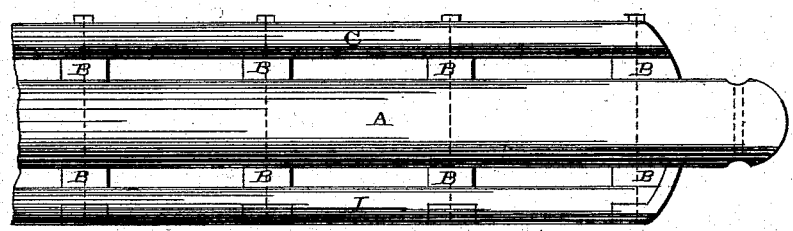
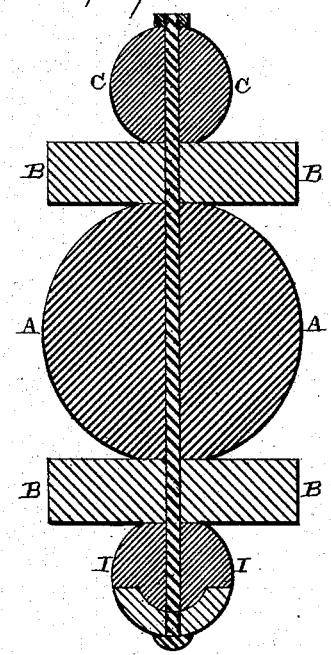
Witnesses.
Louis F. Gardner
E. D. York
Inventor.
F. H. Durell,
Wm Goldie,
per
F. W. Lehmann,
att'y.

UNITED STATES PATENT OFFICE.

FRANK H. DURELL, OF BAY CITY, AND WILLIAM GOLDIE, OF WEST BAY CITY, MICHIGAN.

BOOM-STICK.

SPECIFICATION forming part of Letters Patent No. 276,789, dated May 1, 1883.

Application filed October 6, 1882. (No model.)

*To all whom it may concern:*

Be it known that we, FRANK H. DURELL, of Bay City, and WM. GOLDIE, of West Bay City, in the county of Bay and State of Michigan, have invented certain new and useful Improvements in Boom-Sticks; and we do hereby declare the following to be a full, clear, and exact description of the invention, such as will enable others skilled in the art to which it pertains to make and use it, reference being had to the accompanying drawings, which form part of this specification.

Our invention relates to an improvement in boom-sticks used for securing and keeping together rafts of saw-logs while being towed to their destination; and it consists in the combination of a large log or trunk of a tree, preferably of pine, a smaller log or stick, preferably of cedar, or some other light and strong wood, a counter-balance consisting of a stick of oak or some other dense, heavy wood, and suitable bolts for securing them together, as will be more fully described hereinafter.

The object of our invention is to produce a boom-stick which shall float sufficiently high in the water, so that the logs that are being towed will not be washed out of the crib during rough weather.

Figure 1 is a side elevation of a boom-stick embodying our invention. Fig. 2 is a vertical cross-section of the same.

A represents a large log, or the trunk of a large tree, preferably of pine or some other light wood which will float as high as possible in the water. Two opposite parallel sides are cut away, as shown, so as to form flat surfaces, against which are placed the cross-timbers or saddles B. These saddles serve to give a much greater height to the boom-stick without adding materially to its weight. Upon the top of the upper saddles is placed a smaller log or stick, C, of cedar or some other light and strong wood. Against the under side of the lower saddles is placed the third log or stick, I, preferably of oak, or some other dense and heavy wood, and which log or stick acts as a counter-weight to keep the log A and the log or stick upon its top in position upon the water. After the three logs or sticks, with the intervening saddles, have been placed in position, one above the other, holes at suitable distances apart are bored down through them, and then suitable clamping rods or bolts are passed through them all, so as to hold them rigidly together. In the under side of the counter-weight may be cut recesses of any kind, in which iron castings or shoes may be placed, and the bolts passed up through the castings. By recessing these shoes they are prevented from catching against the ground in shallow water, so as to impede the motion of the stick. If castings are used, they assist the counter-weight in holding the other parts always in a vertical position in the water.

After a suitable number of these boom-sticks have been formed they are united together, so as to form a crib, in which the saw-logs which have to be towed to their destination are placed. As these cribs have heretofore been constructed they consist of nothing else than the trunks of large pine trees which are chained together at the corners. These cribs, setting low in the water, allow the logs to be washed over their tops and lost in rough weather.

The object of our invention is to provide boom-sticks which will ride high enough upon the water to prevent the logs from being washed out of the crib in the very roughest of weather. Owing to the greater specific gravity of the counter-weight the boom-stick will always retain its position in the water under any circumstances. Of course the same thing, to a certain extent, might be secured by using only two sticks and loading the under side of the one with iron or some other heavy material; but we prefer to use a stick of timber of suitable weight, as it offers more resistance to a rolling movement when the logs in the crib are thrown violently against it.

We do not limit ourselves to the precise construction here shown, for this may be varied without departing from the spirit of our invention.

Having thus described our invention, we claim—

1. The combination of the central log, saddles which are placed upon opposite sides thereof, the lighter logs, C I, upon the outer sides of the saddles, and bolts for clamping the parts together, substantially as shown.

2. A boom-stick composed of a central log, a smaller or lighter log placed upon its top, and a counter-weight, which is placed under the central log, and suitable clamping-bolts for securing the logs or sticks together, substantially as described.

In testimony whereof we affix our signatures in presence of two witnesses.

FRANK H. DURELL.
WILLIAM GOLDIE.

Witnesses:
JOHN DRAKE,
F. L. WANDS.